Patented Mar. 5, 1946

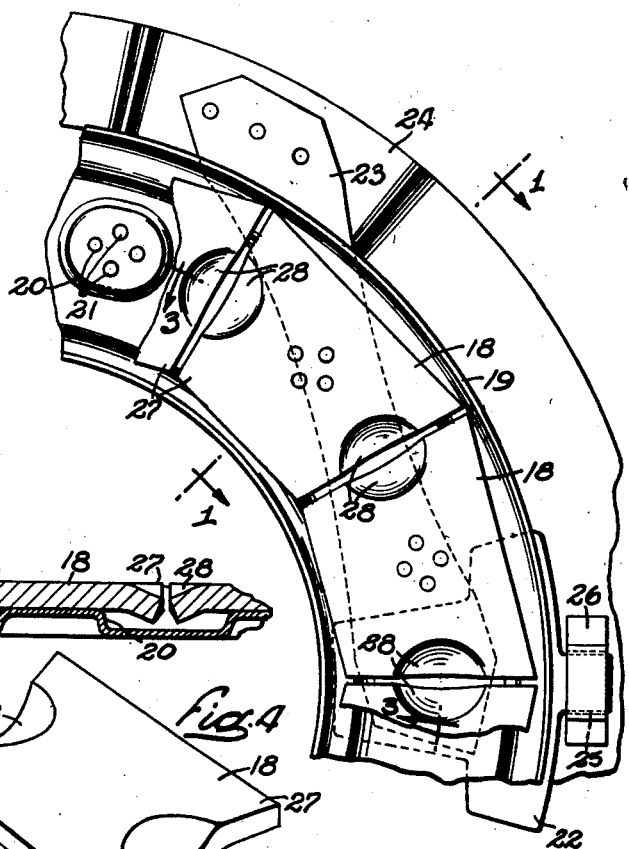
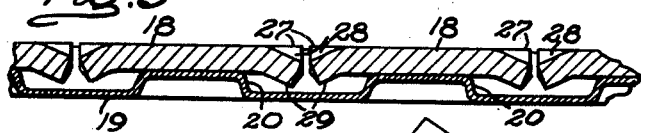
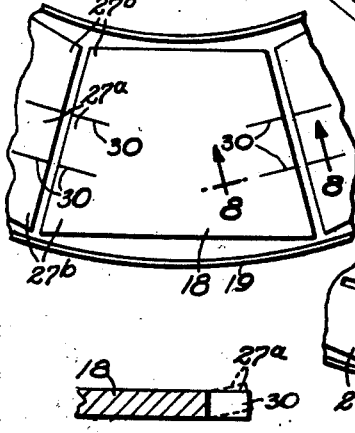
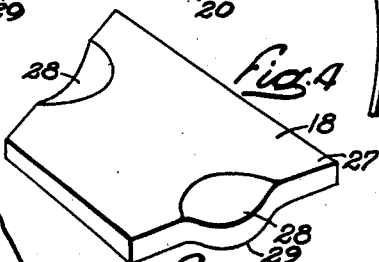
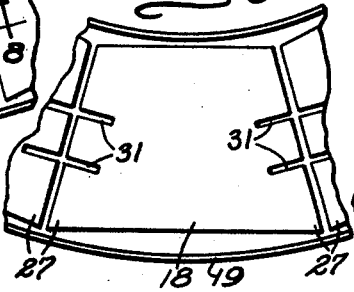
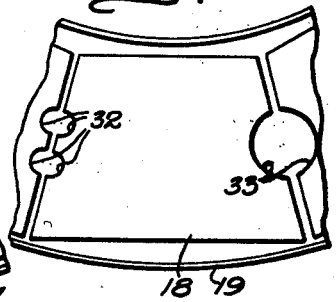

2,395,905

UNITED STATES PATENT OFFICE 2,395,905

ELECTROMAGNETIC FRICTION DEVICE

John George Oetzel, Beloit, Wis., assignor to Warner Electric Brake Manufacturing Company, Beloit, Wis., a corporation of Illinois Application April 15, 1944, Serial No. 531,261

12 Claims. (Cl. 188—161)

This invention relates to friction devices having relatively rotatable faces that are brought into gripping engagement electromagnetically.

The primary object of the invention is to eliminate noise incident to such gripping engagement by constructing one of the gripping elements in a novel manner so as to eliminate vibration thereof at audible frequencies.

Another object is to eliminate audible vibration in a friction element that comprises an annular series of segments.

The invention also resides in the novel structural character of the vibration reducing means.

Other objects and advantages of the invention will become apparent from the following detailed description taken in connection with the accompanying drawings, in which Figure 1 is a diametrical sectional view of a friction device embodying the present invention, part of the section being along the line 1—1 of Fig. 2.

Fig. 2 is a fragmentary face view of the armature.

Fig. 3 is a fragmentary sectional view taken along the line 3—3 of Fig. 2.

Fig. 4 is a perspective view of one of the armature segments.

Figure 1:
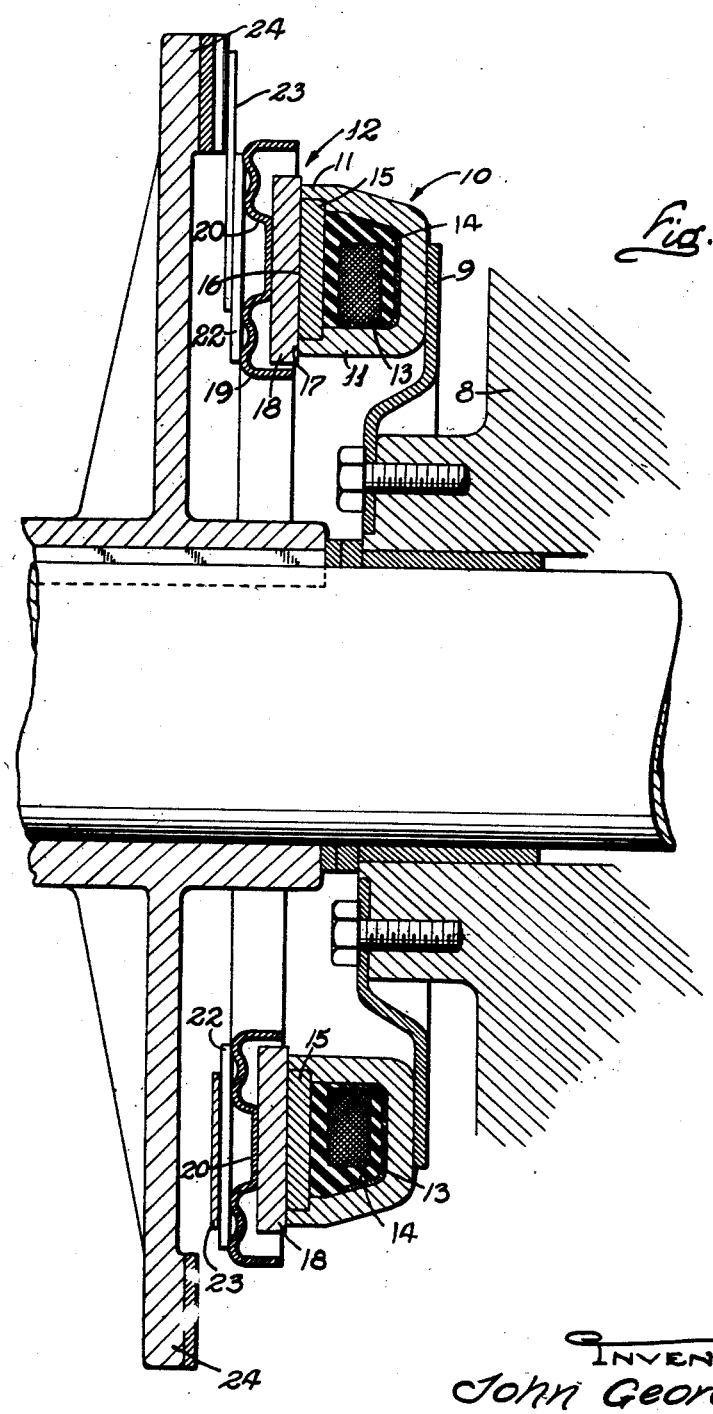

Figs. 5, 6, and 7 are views similar to Fig. 2 showing modifications.

Fig. 8 is a section taken along the line 8—8 of Fig. 5.

In the drawings, the invention is shown embodied in an electromagnetic friction brake comprising a magnet 10 providing a pair of concentric pole pieces 11 bridged by an armature 12 which is rotatable relative to the magnet and adapted for axial gripping engagement with the friction face of the magnet. Herein, the magnet is a ring of generally U-shaped cross-section in which a coil 13 is disposed and secured by a hardened filling 14. Shoulders formed on the pole pieces support segments 15 of non-magnetic friction material that provide an axially facing gripping surface 16 substantially flush with the pole faces 17. In this instance, the magnet 10 is the non-rotatable element of the brake being secured as by welding to a plate 9 carried by a non-rotatable support 8.

In the form shown, the armature comprises a series of generally flat pieces or plates 18 of magnetic material wide enough to overlap the magnet poles 17 and of substantially the same circumferential length as radial width. These plates are arranged end to end around a supporting member 19 in the form of a ring of non-magnetic sheet metal. Each plate 18 is rigidly secured intermediate its margins to the ring 19 with its margins spaced therefrom. For this purpose, raised portions 20 or projections are formed in the ring, and the plates are welded to the ends of the projections each at a plurality of points 21 preferably spaced both radially and circumferentially.

Secured, as by welding, to the back of the supporting ring 19 are a plurality of strips 22 which in turn are welded to the ends of tangentially extending flat spring arms 23. The other ends of the latter are fastened rigidly to a suitable support 24 which, in this instance, is a rotatable part whose motion is to be checked by the brake. The spring arms 23 urge the armature 12 toward the magnet and thus maintain continuous mechanical contact between the magnet face and the surfaces of the plate segments 18. The arms act in tension to sustain the torque applied to the armature in one direction, and a lug 25 on the ring 19 engages a stop 26 on the support 24 to sustain the torque applied to the armature in the reverse direction.

When an armature, constructed in the manner above described, is brought into gripping engagement with the magnet by energization of the coil 13, vibration frequently occurs at audible frequency producing objectionable noise. I have discovered that this vibration is confined largely to those unsupported margins 27 which overhang the supports 20 for the individual plates. These margins lie intermediate the inner and outer magnet poles and engage directly with the main friction surface of the magnet.

Based on this discovery, the invention contemplates deforming the adjacent margins of adjacent segments to reduce the vibrating tendency either by dividing the margins 27 into parts having different natural periods as shown in Figs. 5 to 8, or by rendering these margins sufficiently rigid to resist vibration. The latter form of deformation is preferred in order to avoid any substantial interruption in that portion of the magnetic flux circuit through the armature. As shown in Figs. 1 to 4, the margins 27 are struck back to form shallow depressions 28 whose bottom concave surfaces taper toward the center of the plate 18 and merge with the friction faces thereof short of the raised portions 20. Herein, the depressions 28 are generally semi-circular and of a diameter approximately equal to one-third of radial width of the plates. The depressions are so shallow that their convex surfaces 29 are spaced from the ring 19.

By thus deforming the margins 27, the latter are made substantially more rigid and less apt to vibrate during gripping engagement of the segments and the magnet. It will be noted that the metal of the segments is not interrupted so that the provision of the depressions does not involve an increase in the reluctance of that portion of the magnetic circuit which extends radially through the armature.

One way of minimizing vibration is by dividing the margins 27 as illustrated in Fig. 5. In this case, a central portion 27a of the margin is sheared out of the plate 18 as shown in phantom in Fig. 8 and then bent back into its former position (see Fig. 5) so as to leave the metal divided along lines 30 without introducing any appreciable air gaps. With the margins thus divided into three parts 27a and 27b which normally have different natural vibration periods, the tendency of the segments to vibrate at audible frequencies may be removed.

At some sacrifice in magnetic efficiency, other types of deformations may be employed to produce a similar division of the margins 27. These may include spaced open ended slots 31 (Fig. 6) cut in the margins 27 as by sawing. Or recesses 32 or 33 (Fig. 7) varying in size, shape, and number may be employed.

This application is a continuation in part of my application Serial No. 419,847 filed November 21, 1941, now Patent No. 2,353,185 granted July 11, 1944.

I claim as my invention:

1. A magnetic element comprising a plurality of flat pieces of magnetic material arranged end to end in an annular series, and supporting means for said pieces attached to the latter intermediate the edges thereof, the opposite sides of said pieces presenting a substantially flat friction surface and certain of the radial margins of said pieces having depressions formed in said friction face and each tapering toward the center of the plate.

2. A magnetic friction element comprising a plurality of plates of magnetic material arranged end to end in an annular series, and supporting means for said plates attached to the latter intermediate the edges thereof, the opposite sides of said plates presenting a substantially flat friction surface and certain of the unsupported margins of said plates being bent away from said friction surface to increase the rigidity of the plates.

3. In an electromagnetic friction device, a magnetic element comprising a plurality of plates of magnetic material arranged end to end in an annular series, and supporting means for said plates secured to one side of the latter intermediate the edges thereof so as to leave the adjacent margins of adjacent plates unsupported, the opposite sides of said plates presenting a substantially flat friction surface and part of said margins being depressed out of the plane of said surface while leaving the radial magnetic path through the plates uninterrupted.

4. In an electromagnetic friction device, an armature comprising a ring of sheet metal, and a plurality of flat pieces of magnetic material arranged in an annular series around said ring and defining the friction face of said armature ring, said pieces being individually attached to the ring intermediate the margins of the pieces with said margins spaced from the ring, the adjacent unsupported margins of adjacent pieces being bent intermediate the ends and toward said ring whereby to strengthen such margins and prevent audible vibration thereof during gripping engagement with a coacting friction element.

5. In an electromagnetic friction device, an armature comprising a ring of sheet metal, and a plurality of flat pieces of magnetic material arranged in an annular series around said ring and defining the friction face of said armature, said pieces being individually attached to the ring at points intermediate the margins of the pieces, the adjacent unsupported margins of adjacent pieces having circumferentially extending open ended slots therein operable to change the frequency of vibration of such margins during gripping engagement with a coacting friction element.

6. In an electromagnetic friction device, an armature adapted for rubbing contact with a coacting friction element and comprising an annular supporting member, a plurality of flat pieces of magnetic material arranged in an annular series around said member and individually attached thereto at points intermediate the margins of the pieces, and a plurality of circumferentially open ended recesses formed in the unsupported margins of said pieces.

7. A magnetic element comprising a plurality of pieces of magnetic material arranged end to end in an annular series, supporting means for said pieces secured to one side of the latter intermediate the edges thereof so as to leave the adjacent margins of adjacent pieces unsupported, the opposite sides of said pieces presenting a substantially flat friction surface, and means dividing certain of said margins into a plurality of parts having different natural vibration periods.

8. A magnetic element comprising a plurality of plates of magnetic material arranged end to end in an annular series, and supporting means for said plates secured to one side of the latter intermediate the edges thereof, the opposite sides of said plates presenting a substantially flat friction surface, and the metal of certain of said margins being parted at spaced lines to divide the margin into a plurality of abutting portions having a substantially uninterrupted magnetic circuit extending radially therethrough.

9. In an electromagnetic friction device, an armature comprising a ring of sheet metal, a plurality of flat pieces of magnetic material arranged in an annular series around said ring and defining the friction face of said armature, said pieces being individually attached to the ring intermediate the margins of the pieces, and means formed in the adjacent margins of the adjacent pieces and operable to prevent vibration of the pieces at audible frequencies during gripping engagement of the armature with a coacting friction element.

10. A magnetic element comprising a plurality of pieces of magnetic material arranged end to end in an annular series, supporting means for said pieces secured to one side of the latter intermediate the edges thereof so as to leave the adjacent margins of adjacent pieces unsupported, the opposite sides of said pieces presenting a substantially flat friction surface, and means formed in certain of said margins and operable during gripping engagement of said surface with a coacting surface to prevent vibration of said margins at audible frequency.

11. In an electromagnetic friction device, a magnetic element including an integral plate of magnetic material, and supporting means for said plate secured to one side of the latter intermediate the edges thereof so as to leave the margins of the plate unsupported, the opposite side of said plate presenting a substantially flat friction surface and part of certain of the margins being deformed to increase the rigidity of said plate while leaving uninterrupted the magnetic path extending edgewise through the deformed margin.

12. A magnetic element comprising a plurality of pieces of magnetic material arranged end to end in an annular series, supporting means for said pieces secured to one side of the latter intermediate the edges thereof so as to leave the adjacent margins of adjacent pieces unsupported, the opposite sides of said pieces presenting a substantially flat friction surface, and means formed in certain of said margins and operable during gripping engagement of said surface with a coacting surface to prevent vibration of said margins at audible frequency, said last mentioned means leaving uninterrupted the magnetic path extending edgewise through the formed margins.

JOHN GEORGE OETZEL.